United States Patent
Kamiya et al.

(10) Patent No.: US 11,919,974 B2
(45) Date of Patent: Mar. 5, 2024

(54) OXIDIZED CELLULOSE, METHOD OF PRODUCING OXIDIZED CELLULOSE AND NANOCELLULOSE, AND NANOCELLULOSE DISPERSION

(71) Applicant: TOAGOSEI CO., LTD., Tokyo (JP)

(72) Inventors: Daisuke Kamiya, Tokyo (JP); Shiroshi Matsuki, Nagoya (JP); Jun Takada, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 17/265,035

(22) PCT Filed: Aug. 2, 2019

(86) PCT No.: PCT/JP2019/030392
§ 371 (c)(1),
(2) Date: Feb. 1, 2021

(87) PCT Pub. No.: WO2020/027307
PCT Pub. Date: Feb. 6, 2020

(65) Prior Publication Data
US 2021/0301034 A1    Sep. 30, 2021

(30) Foreign Application Priority Data
Aug. 3, 2018   (JP) ................. 2018-146352

(51) Int. Cl.
*C08B 15/04*    (2006.01)

(52) U.S. Cl.
CPC .................. *C08B 15/04* (2013.01)

(58) Field of Classification Search
CPC ................................................ C08B 15/04
See application file for complete search history.

(56) References Cited

U.S. PATENT DOCUMENTS

| | | | |
|---|---|---|---|
| 5,414,079 A | 5/1995 | Banker et al. | |
| 9,534,091 B2 * | 1/2017 | Saiki | C09D 101/04 |
| 2015/0027648 A1 * | 1/2015 | Tsuji | D21H 11/18 |
| | | | 162/26 |
| 2017/0101738 A1 | 4/2017 | Carter et al. | |
| 2020/0270369 A1 | 8/2020 | Kamiya et al. | |

FOREIGN PATENT DOCUMENTS

| | | | | |
|---|---|---|---|---|
| JP | A S49-34989 | 3/1974 | | |
| JP | S60222140 A | 11/1985 | | |
| JP | 2009197122 | 9/2009 | | |
| JP | 2011184648 | 9/2011 | | |
| JP | A 2015-113453 | 6/2015 | | |
| JP | 5843313 | 1/2016 | | |
| JP | 2016210830 A | 12/2016 | | |
| JP | 2017052888 A | 3/2017 | | |
| JP | 2017193814 A | * 10/2017 | | |
| JP | A 2017-193814 | 10/2017 | | |
| KR | 20180028707 | 3/2018 | | |
| WO | WO-2010116826 A1 | * 10/2010 | ............ | B82Y 30/00 |
| WO | WO2018/230354 | 12/2018 | | |

OTHER PUBLICATIONS

Japanese Office Action (w/ English translation) for corresponding Japanese Application No. 2020-534759, dated Oct. 25, 2021, 14 pages.
Araki, Tsunao et al., "Production of microcrystalline cellulose by oxidant oxidation method", Kobunshi Kagaku, 1972, vol. 29, No. 329, pp. 652-656, ISSN: 0023-2556, in particular, 2.1 on p. 52, table 2, non official translation.
Saito, Tsuguyuki et al., "Preparation of Cellulose Single Microfibrils from Native Celluloses by TEMPO-Mediated Oxidation", Cellulose Commun., 2007, vol. 14 (2), pp. 62-66.
International Search Report (with English translation) PCT/JP2019/030392, dated Oct. 8, 2019 (5 pages).
Written Opinion of the ISA (with English translation) PCT/JP2019/030392, dated Oct. 8, 2019 (12 pages).
Chinese First Office Action (w/ English translation) for corresponding CN Application No. 2019800503336, dated May 5, 2022.
Extended European Search Report for corresponding EP Application No. 19843439.1, dated Apr. 12, 2022, 6 pages.
Indian Office Action (w/ English Translation) for corresponding IN Application No. 202137007087, dated Jul. 18, 2022, 7 pages.
Nabar et al., "The Oxidation of Cellulose by Sodium Hypochlorite in Presence of Ferrous Hydorxide", Journal of the Society of Dyers and Colourists, vol. 61, No. 10, 1945, pp. 158-263.
Chinese Office Action (w/ English Translation) for corresponding Application No. 201980050333.6, dated Jan. 20, 2023, 27 pages.
Chinese Office Action (w/ English Translation) for corresponding Application No. 201980050333.6, dated Jul. 20, 2023, 27 pages.
Japanese Office Action (w/ English translation) for corresponding Application No. 2022-070919, dated May 29, 2023, 15 pages.

* cited by examiner

*Primary Examiner* — Shaojia A Jiang
*Assistant Examiner* — Everett White
(74) *Attorney, Agent, or Firm* — Dority & Manning, PA (57) ABSTRACT

Provided is an oxidized cellulose, a $^{13}C$ solid-state NMR spectrum of the oxidized cellulose including a number of peaks in a range of from 165 ppm to 185 ppm, which can be produced by oxidizing a cellulose raw material with a hypochlorous acid or salt thereof having an available chlorine concentration of from 6% by mass to 14% by mass, while adjusting the pH in a range of from 5.0 to 14.0.

9 Claims, 4 Drawing Sheets

OXIDIZED CELLULOSE, METHOD OF PRODUCING OXIDIZED CELLULOSE AND NANOCELLULOSE, AND NANOCELLULOSE DISPERSION

CROSS-REFERENCE TO RELATED APPLICATIONS

The present application is related and has right of priority to JP 2018-146352, which was filed on Aug. 3, 2018 in the Japanese Patent Office, and is a U.S. national phase entry of PCT/JP2019/030392, which was filed on Aug. 2, 2019, both of which are incorporated by reference in their entireties for all purposes.

TECHNICAL FIELD

The present invention relates to an oxidized cellulose obtained by oxidizing a cellulose raw material, a method of producing an oxidized cellulose and a nanocellulose, and a nanocellulose dispersion. More specifically, the present invention relates to an oxidized cellulose in which hydroxy groups at a number of positions are oxidized within a specific pH range with, as an oxidant, a hypochlorous acid or salt thereof having an available chlorine concentration of from 6% by mass to 14% by mass, as well as a method of producing the oxidized cellulose.

Further, the present invention relates to a method of producing a nanocellulose, the method including fibrillating and nanoizing the oxidized cellulose, as well as a nanocellulose dispersion.

BACKGROUND ART

A method of producing nanocellulose materials, such as cellulose nanofibers, by oxidizing various cellulose raw materials has been studied. For example, a method of oxidizing a cellulose raw material with sodium hypochlorite, which is an oxidant, under the presence of 2,2,6,6-tetramethyl-1-piperidin-N-oxy radical (hereinafter, referred to as TEMPO) is disclosed (Non-Patent Document 1).

Further, cellulose nanofibers that are produced by a method without using an N-oxyl catalyst, such as TEMPO, and that have a content of carboxyl groups of from 0.20 to 0.50 mmol/g with respect to a dry mass of the cellulose nanofibers, have an average fiber diameter of from 3 to 100 nm, and do not contain an N-oxyl compound are disclosed (Patent Document 1).

PRIOR ART DOCUMENT

Patent Documents

Patent Document 1: Japanese Patent Application Laid-open (JP-A) No. 2017-193814

Non-Patent Documents

Non-Patent Document 1: Cellulose Commun., 14 (2), 62 (2007)

SUMMARY OF INVENTION

Technical Problem

However, in the oxidized cellulose produced using, as a catalyst, an N-oxyl compound such as TEMPO in the prior art document described above, about several ppm of the N-oxyl compound remain as a nitrogen content even after well washing.

There is concern about environmental and human toxicities of N-oxyl compounds. Therefore, in the case in which the oxidized cellulose is used to prepare a cellulose nanofiber aqueous dispersion, the N-oxyl compound will be incorporated also in the dispersion. Thus, in the case in which the nanocellulose is used as a highly functional material, the N-oxyl compound present in the dispersion may have undesirable effects depending on the use thereof.

In addition, since N-oxyl compounds are very expensive materials, it cannot be said that production methods employing N-oxyl compounds are not economical.

According to Patent Document 1, it is described that the method includes an oxidation step of oxidizing cellulose at a pH of from 5.0 to 9.0 in a solvent containing hypochlorous acid or sodium hypochlorite to obtain an oxidized cellulose, and a fibrillation step of fibrillating the oxidized cellulose in a solvent to obtain a cellulose nanofiber dispersion that does not contain an N-oxyl compound. However, since an amount of carboxyl groups in the oxidized cellulose is as low as from 0.20 to 0.50 mmol/g, excessive mechanical fibrillation is required in the fibrillation step. Therefore, it cannot be said that the method is an efficient production method.

In view of the foregoing, an object of the present invention is to provide an oxidized cellulose, which is able to produce a nanocellulose without an N-oxyl compound such as TEMPO remaining in the nanocellulose and by an efficient method that does not require excessive mechanical fibrillation.

Solution to Problem

As a result of intensive studies in order to solve the problem above, the present inventors have found that an oxidized cellulose in which hydroxyl groups at a number of positions of a cellulose raw material are oxidized can be fibrillated without requiring a mechanical treatment under excessive conditions. Further, the present inventors have found that, by using, as an oxidant, a hypochlorous acid or salt thereof having an available chlorine concentration of from 6% by mass to 14% by mass and adjusting the pH during the oxidation reaction in a range of from 5.0 to 14.0, the oxidized cellulose excellent in fibrillability can be produced by oxidizing a cellulose raw material without using an N-oxyl compound such as TEMPO as a catalyst. Thus, the present inventors have completed the present invention.

Accordingly, the present invention includes the following configuration.

<1> An oxidized cellulose, a $^{13}C$ solid-state NMR spectrum of the oxidized cellulose including a number of peaks in a range of from 165 ppm to 185 ppm.

<2> An oxidized cellulose, not containing an N-oxyl compound, a $^{13}C$ solid-state NMR spectrum of the oxidized cellulose including a number of peaks in a range of from 165 ppm to 185 ppm.

<3> A method of producing the oxidized cellulose according to <1> or <2>, the method including:
   oxidizing a cellulose raw material with a hypochlorous acid or salt thereof having an available chlorine concentration of from 6% by mass to 14% by mass, while adjusting the pH in a range of from 5.0 to 14.0.

<4> The method of producing an oxidized cellulose according to <3>, in which the hypochlorous acid or salt thereof is sodium hypochlorite.

<5> The method of producing an oxidized cellulose according to <3> or <4>, in which the cellulose raw material is oxidized while adjusting the pH in a range of from 7.0 to 14.0.

<6> The method of producing an oxidized cellulose according to any one of <3> to <5>, in which a content of carboxyl groups in the oxidized cellulose is from 0.20 mmol/g to 3.0 mmol/g with respect to a dry mass of the oxidized cellulose.

<7> A method of producing a nanocellulose, the method including fibrillating and nanoizing the oxidized cellulose according to <1> or <2>.

<8> A nanocellulose dispersion, including the nanocellulose produced by the method according to <7> dispersed in at least one selected from the group consisting of water, acetonitrile, and a carbonate ester.

Advantageous Effects of Invention

Since the oxidized cellulose of the present invention has a chemical structure different from those of conventional oxidized celluloses produced using an N-oxyl compound, the oxidized cellulose can be fibrillated without requiring excessive mechanical treatment when fibrillating the oxidized cellulose. Further, since an N-oxyl compound that is a catalyst is not used, the resulting oxidized cellulose does not contain an N-oxyl compound, which reduces the risk of toxicities to environment and human body. Furthermore, since a TEMPO compound, which is an expensive catalyst, is not used, it is an economically excellent production method.

DESCRIPTION OF EMBODIMENTS

The oxidized cellulose of the present invention is an oxidized cellulose, a $^{13}C$ solid-state NMR spectrum of the oxidized cellulose including a number of peaks in a range of from 165 ppm to 185 ppm, and is preferably an oxidized cellulose not containing an N-oxyl compound. That an N-oxyl compound is not contained means that a content of N-oxyl compound is 3 ppm or less.

(Measurement of $^{13}C$ Solid-State NMR of Oxidized Cellulose)

The $^{13}C$ solid-state NMR of the oxidized cellulose in the present invention is measured under the following conditions.

(1) Sample tube: 4 mm diameter made of zirconia
(2) Magnetic field strength: 9.4 T (1H resonance frequency 400 MHz)
(3) MAS rotation speed: 15 kHz
(4) Pulse sequence: CPMAS method
(5) Contact time: 4 ms
(6) Waiting time: 5 seconds
(7) Accumulation time: 10,000 to 15,000 times
(8) Measurement device: JNM ECA-400 (manufactured by JEOL Ltd.)

A peak in a range of from 165 ppm to 185 ppm in the $^{13}C$ solid-state NMR spectrum is a peak that is attributed to a carboxyl group (—COOH). In the case in which there is a number of the peaks, it means that the oxidized cellulose has a structure in which a number of carbons in the structural unit of a cellulose raw material is oxidized.

Whether there is a number of peaks or there is one peak can be determined by an area ratio of the corresponding peak(s).

Accordingly, a baseline is drawn on the peak(s) in a range of from 165 ppm to 185 ppm in the NMR spectrum to determine a total area value, and the area value is then subjected to vertical division at the peak top to obtain two peak area values. When a ratio (larger area value/smaller area value) of the two peak area values is 1.2 or more, it is considered that there is a number of peaks.

Accordingly, in the case in which there is only one peak in a range of from 165 ppm to 185 ppm, the ratio of the peak area values is close to 1.0, and is less than 1.2 even when taking into consideration a calculation error of the area values.

Assignment of carbon peaks in the $^{13}C$ solid-state NMR spectrum is described in polymer advanced materials "One Point", separate volume "Frontier of Polymer Analysis Technology", pp. 125-126 (KYORITSU SHUPPAN CO., LTD., published on Dec. 25, 2007) and "Encyclopedia of Cellulose", pp 153-156 (Asakura Publishing Co., Ltd., published on Nov. 10, 2000).

The oxidized cellulose having a structure in which a number of carbons in the constituent unit of the raw material cellulose is oxidized can be fibrillated without requiring excessive mechanical treatment during fibrillation.

The method of producing an oxidized cellulose of the present invention is a method, including oxidizing a cellulose raw material with a hypochlorous acid or salt thereof having an available chlorine concentration of from 6% by mass to 14% by mass, while adjusting the pH in a range of from 5.0 to 14.0. The method will be specifically described below.

The cellulose raw material in the present invention is not particularly limited as long as it is a material mainly containing cellulose. Examples of the cellulose raw material include a pulp, a natural cellulose, a regenerated cellulose, and a fine cellulose obtained by depolymerizing a cellulose raw material through mechanical treatment. As the cellulose raw material, a commercially available product such as a pulp-derived crystalline cellulose can be used directly. The cellulose raw material may be pretreated with an appropriate concentration of alkali for the purpose of facilitating permeation of an oxidant that is used into the raw material pulp.

The method of producing an oxidized cellulose in the present invention is a method, including oxidizing a cellulose raw material with a hypochlorous acid or salt thereof having an available chlorine concentration of from 6% by mass to 14% by mass, while adjusting the pH in a range of from 5.0 to 14.0, to produce the oxidized cellulose.

By using the hypochlorous acid or salt thereof having an available chlorine concentration of from 6% by mass to 14% by mass, an amount of carboxyl groups in the oxidized cellulose becomes an appropriate amount, and fibrillation of the oxidized cellulose into a nanocellulose can be easily performed.

Further, the pH during the reaction is preferably adjusted in a range of from 7.0 to 14.0. When the pH is in this range, an amount of carboxyl groups in the oxidized cellulose becomes an appropriate amount, and fibrillation of the oxidized cellulose into a nanocellulose can be easily performed.

The available chlorine concentration of a hypochlorous acid or salt thereof is well known and is defined as follows.

Hypochlorous acid is a weak acid that exists only in a form of an aqueous solution A hypochlorite is a compound in which a hydrogen of hypochlorous acid is replaced with another cation.

For example, since sodium hypochlorite, which is a hypochlorite, exists only in a solution, an available chlorine amount in the solution is measured instead of a concentration of sodium hypochlorite itself.

With respect to the available chlorine of sodium hypochlorite, an oxidizing power of the divalent oxygen atom generated by decomposition of sodium hypochlorite corresponds to that of 2 equivalents of monovalent chlorine atoms and thus, a bonding chlorine atom of sodium hypochlorite (NaClO) has an oxidizing power that is equivalent to that of two atoms of a non-bonding chlorine ($Cl_2$). Therefore, the available chlorine is 2×(chlorine in NaClO).

Specifically, the available chlorine concentration is measured by precisely weighing a sample, adding water, potassium iodide, and acetic acid to the sample, leaving the mixture to stand, and titrating liberated iodine with a sodium thiosulfate solution using an aqueous starch solution as an indicator.

Examples of the hypochlorous acid or salt thereof in the present invention include an aqueous hypochlorous acid, sodium hypochlorite, potassium hypochlorite, calcium hypochlorite, and ammonium hypochlorite. Among these, sodium hypochlorite is preferable from the viewpoint of ease of handling.

The production method of the present invention will be described below using sodium hypochlorite as an example of the hypochlorous acid or salt thereof.

Examples of the method of adjusting the available chlorine concentration of a sodium hypochlorite aqueous solution in a range of from 6% by mass to 14% by mass include a method of concentrating a sodium hypochlorite aqueous solution that has an available chlorine concentration of lower than 6% by mass, and a method of diluting a sodium hypochlorite aqueous solution that has an available chlorine concentration higher than the target concentration or dissolving a crystal of sodium hypochlorite, for example, a pentahydrate. Among these, the method of diluting a sodium hypochlorite aqueous solution or dissolving a crystal of sodium hypochlorite to adjust in the available chlorine concentration as an oxidant is preferable from the viewpoint of less self-decomposition, that is, less decrease in available chlorine concentration, and ease of adjustment.

The usage amount of the sodium hypochlorite aqueous solution having an available chlorine concentration of from 6% by mass to 14% by mass used as an oxidant can be selected within a range in which the oxidation reaction is promoted.

The method of mixing the cellulose raw material and the sodium hypochlorite aqueous solution is not particularly limited. It is preferable to add the cellulose raw material to the sodium hypochlorite aqueous solution and mix them from the viewpoint of ease of operation.

The reaction temperature of the oxidation reaction is preferably from 15° C. to 100° C., and more preferably from 20° C. to 90° C. The pH of the reaction mixture decreases, as carboxyl groups are produced in the cellulose raw material by the oxidation reaction. In order to efficiently promote the oxidation reaction, it is necessary to adjust the pH of the reaction mixture in a range of from 5.0 to 14.0. In order to adjust the pH, an alkaline agent such as sodium hydroxide or an acid such as hydrochloric acid can be added.

The reaction time of the oxidation reaction can be set according to degree of progress of the oxidation. For example, it is preferable that the reaction is carried out from about 15 minutes to about 50 hours.

In the case in which the pH of the reaction mixture is adjusted to 10 or more, it is preferable to set the reaction temperature to 30° C. or higher and/or the reaction time to 30 minutes or longer.

In the oxidation reaction, primary hydroxy groups in the cellulose raw material are oxidized into carboxyl groups to produce an oxidized cellulose. The amount of carboxyl groups in the oxidized cellulose is not particularly limited. Taking into consideration fibrillating and nanoizing the oxidized cellulose to produce a nanocellulose, the amount of carboxyl groups per gram of the oxidized cellulose is preferably from 0.20 mmol/g to 3.0 mmol/g, and more preferably from 0.55 mmol/g to 3.0 mmol/g.

When the amount of carboxyl groups in oxidized cellulose is in the range of from 0.20 mmol/g to 3.0 mmol/g, fibrillation of the oxidized cellulose into a nanocellulose can be easily performed. When the amount is in the range of from 0.55 mmol/g to 3.0 mmol/g, fibrillation can be more easily performed.

The amount of carboxyl groups in the oxidized cellulose can be measured by the following method.

Pure water is added to 0.5% by mass slurry of an oxidized cellulose to achieve a volume of 60 mL, and 0.1 M aqueous hydrochloric acid is added to achieve a pH of 2.5. Then, 0.05 N sodium hydroxide aqueous solution is added dropwise, while measuring electrical conductivity until the pH reaches 11. The amount of carboxyl groups in the oxidized cellulose is calculated, using the following Formula, from an amount (a) of sodium hydroxide that has been consumed in a neutralization step of weak acid in which the change in electrical conductivity is slow:

amount of carboxyl groups (mmol/g oxidized cellulose)=$a$ (mL)×0.05/mass of oxidized cellulose (g).

The oxidized cellulose obtained by the production method of the present invention can be fibrillated and nanoized to produce a nanocellulose Here, the nanocellulose is a generic term for nanoized celluloses including cellulose nanofibers, cellulose nanocrystals, or the like.

In the method of fibrillating an oxidized cellulose, the fibrillation time can be shortened by carrying out weak stirring such as a stirrer in a solvent or mechanical fibrillation. However, in the case in which mechanical fibrillation is too strong, the nanocellulose may be bent or broken.

The method of the mechanical fibrillation can be selected as appropriate according to the purpose, for example, after fully washing the oxidized cellulose with a solvent. Examples of the method include known mixers or agitators such as a screw mixer, a paddle mixer, a dispersion mixer, a turbine mixer, a high-speed homomixer, a high-pressure homogenizer, an ultrahigh-pressure homogenizer, a bicylindrical homogenizer, an ultrasonic homogenizer, an aqueous counter collision disperser, a beater, a disk refiner, a conical refiner, a double disk refiner, a grinder, and an uniaxial or multiaxial kneader. These can be used singly or in combination of two or more for treatment in a solvent, by which it is possible to perform nanoization of the oxidized cellulose to produce the nanocellulose.

The solvent used for fibrillation is not particularly limited and can be selected as appropriate according to the purpose. Examples of the solvent include water, alcohols, ethers, ketones, N,N-dimethylformamide. N,N-dimethylacetamide, and dimethyl sulfoxide. These may be used singly or in combination of two or more.

Examples of the alcohols include methanol, ethanol, isopropanol, isobutanol, sec-butanol, tert-butanol, methyl cellosolve, ethylene glycol, and glycerin.

Examples of the ethers include ethylene glycol dimethyl ether, 1,4-dioxane, and tetrahydrofuran.

Examples of the ketones include acetone and methyl ethyl ketone.

By selecting an organic solvent as the solvent, it becomes easy to separate the oxidized cellulose obtained in the step described above and the nanocellulose obtained by fibrillation thereof. Further, since a nanocellulose that is dispersed in the organic solvent is obtained, it becomes easy for mixing with a resin that is soluble in the organic solvent, a raw material monomer of the resin, or the like.

Further, a nanocellulose dispersion in which the nanocellulose is dispersed in at least one selected from the group consisting of water, acetonitrile, and a carbonate ester can be used for mixing with a resin component, or the like.

EXAMPLE

Hereinafter, the present invention will be more specifically described with reference to Examples and Comparative Examples.

Example 1

To a beaker, 30.3 g of a sodium hypochlorite pentahydrate crystal having an available chlorine concentration of 42% by mass was added, pure water was added, and the resultant was stirred to achieve an available chlorine concentration of 14% by mass. Then, 35% by mass hydrochloric acid was added thereto and stirred to prepare an aqueous solution having a pH of 7.0.

After warming the sodium hypochlorite aqueous solution to 30° C. in a constant-temperature water bath while stirring using a stirrer, 0.35 g of a product (amount of carboxyl groups of 0.05 mmol/g) that is obtained by mechanically fibrillating a softwood pulp (NIST RM 8495, bleached kraft pulp, manufactured by SIGMA-ALDRICH) into a cotton-like material was added as a cellulose raw material.

After supplying the cellulose raw material, the resultant was stirred for 30 minutes using a stirrer while keeping the temperature at 30° C. in the same constant-temperature water bath and adding 48% by mass sodium hydroxide to adjust the pH during the reaction at 7.0.

After completion of the reaction, the product was subjected to solid-liquid separation by suction filtration using a PTFE membrane filter having a mesh opening of 0.1 μm. The resulting filtered product was washed with pure water, and an amount of carboxyl groups was then measured. The amount of carboxyl groups was 0.62 mmol/g, and the amount of the filtered product was 0.16 g.

Example 2 to Example 16

Each of the oxidation reactions was performed under the same condition as in Example 1, except that each of the available chlorine concentration of the sodium hypochlorite aqueous solution, the pH during the reaction, the reaction temperature, and the reaction time was changed as shown in Table 1.

After completion of the reaction, the product was subjected to solid-liquid separation by suction filtration using a PTFE membrane filter having a mesh opening of 0.1 μm. The resulting filtered product was washed with pure water, and an amount of carboxyl groups was then measured. The amount of carboxyl groups and the amount of the filtered product are indicated in Table 1.

20 g of 1% by mass aqueous dispersion of the oxidized cellulose obtained in each of Examples 3 and 14 was prepared, and subjected to fibrillation for 10 minutes by an ultrasonic homogenizer "UP-400S" (manufactured by Hielscher Ultrasonics) under the conditions of CYCLE 0.5 and AMPLITUDE 50. The solution was added to a centrifuge tube, t-butanol was added thereto, and the resultant was adequately mixed and centrifuged. The operation of removing the obtained supernatant and adding t-butanol was repeated 10 times to carry out solvent substitution.

Figure 1:
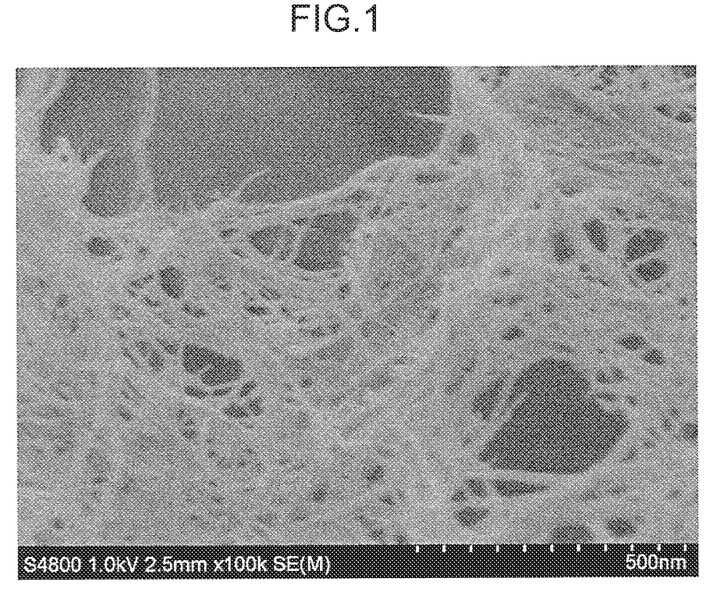
FIG. 1 is an image of a scanning electron microscope (SEM) after fibrillating the oxidized cellulose obtained in Example 3.
Figure 2:
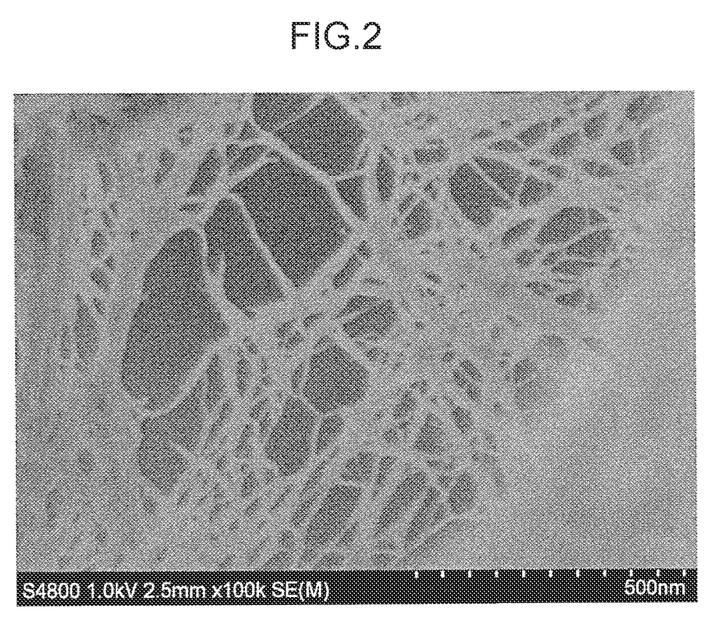
FIG. 2 is an image of a scanning electron microscope (SEM) after fibrillating the oxidized cellulose obtained in Example 14.
Figure 3:
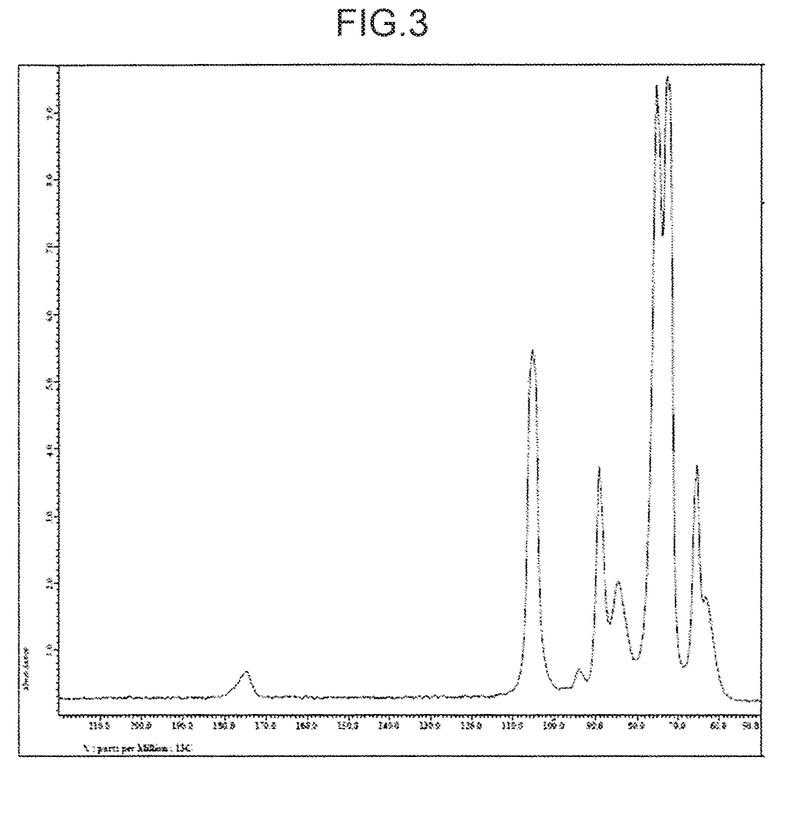
FIG. 3 is a $^{13}C$ solid-state NMR of the oxidized cellulose obtained in Example 2.

The resulting t-butanol dispersion was freeze-dried and then steam-stained with ruthenium tetroxide for 1 hour. As a result of observation with a scanning electron microscope (SEM) (S-4800, manufactured by Hitachi High-Tech Corporation), it was confirmed that cellulose nanofibers having a width of some 10 nm were obtained. Images (at a magnification of 100,000×) of the SEM are shown in FIG. 1 (Example 3) and FIG. 2 (Example 14), respectively.

TABLE 1

| Example | Available Chlorine Concentration (%) | pH | Reaction Temperature (° C.) | Reaction Time (min) | Amount of Carboxyl Groups (mmol/g) | Amount of Filtered Product (g) |
|---|---|---|---|---|---|---|
| 1 | 14 | 7 | 30 | 30 | 0.62 | 0.16 |
| 2 | 14 | 9 | 30 | 30 | 2.26 | 0.12 |
| 3 | 14 | 11 | 30 | 30 | 0.31 | 0.29 |
| 4 | 14 | 13 | 30 | 300 | 0.32 | 0.25 |
| 5 | 13 | 5 | 30 | 30 | 0.55 | 0.16 |
| 6 | 13 | 7 | 30 | 30 | 0.58 | 0.18 |
| 7 | 13 | 9 | 30 | 30 | 0.96 | 0.21 |
| 8 | 7 | 5 | 30 | 30 | 0.55 | 0.24 |
| 9 | 7 | 11 | 30 | 150 | 0.25 | 0.33 |
| 10 | 7 | 11 | 30 | 300 | 0.41 | 0.26 |
| 11 | 7 | 11 | 30 | 500 | 0.55 | 0.21 |
| 12 | 7 | 11 | 50 | 30 | 0.29 | 0.30 |
| 13 | 7 | 11 | 70 | 30 | 0.55 | 0.23 |

TABLE 1-continued

| Example | Available Chlorine Concentration (%) | pH | Reaction Temperature (° C.) | Reaction Time (min) | Amount of Carboxyl Groups (mmol/g) | Amount of Filtered Product (g) |
|---|---|---|---|---|---|---|
| 14 | 6 | 7 | 30 | 30 | 0.60 | 0.16 |
| 15 | 6 | 9 | 30 | 30 | 0.58 | 0.33 |
| 16 | 6 | 10 | 30 | 30 | 0.20 | 0.32 |

Comparative Example 1 to Comparative Example 7

Each of the oxidation reactions was performed under the same condition as in Example 1, except that each of the available chlorine concentration of the sodium hypochlorite aqueous solution, the pH during the reaction, the reaction temperature, and the reaction time was changed as shown in Table 2.

After completion of the reaction, the product was subjected to solid-liquid separation by suction filtration using a PTFE membrane filter having a mesh opening of 0.1 μm. The resulting filtered product was washed with pure water, and an amount of carboxyl groups was then measured. The amount of carboxyl groups and the amount of the filtered product are indicated in Table 2.

TABLE 2

| Comparative Example | Available Chlorine Concentration (%) | pH | Reaction Temperature (° C.) | Reaction Time (min) | Amount of Carboxyl Groups (mmol/g) | Amount of Filtered Product (g) |
|---|---|---|---|---|---|---|
| 1 | 16 | 4 | 30 | 30 | 0.12 | 0.24 |
| 2 | 6 | 4 | 30 | 30 | 0.15 | 0.26 |
| 3 | 0.4 | 7 | 30 | 30 | 0.11 | 0.33 |
| 4 | 0.4 | 9 | 30 | 30 | 0.05 | 0.33 |
| 5 | 0.4 | 11 | 30 | 30 | 0.09 | 0.33 |
| 6 | 0.4 | 11 | 30 | 500 | 0.10 | 0.33 |
| 7 | 0.4 | 11 | 70 | 30 | 0.14 | 0.31 |

Comparative Example 8

To a beaker, 0.016 g of TEMPO and 0.1 g of sodium bromide were added, pure water was added and stirred to prepare an aqueous solution, and 1.0 g of a product (amount of carboxyl groups of 0.05 mmol/g) that is obtained by mechanically fibrillating a softwood pulp (NIST RM 8495, bleached kraft pulp, manufactured by SIGMA-ALDRICH) into a cotton-like material was added as a cellulose raw material.

After warming the aqueous solution to 25° C. in a constant-temperature water bath while stirring using a stirrer, 0.1M sodium hydroxide was added thereto and stirred to prepare an aqueous solution having a pH of 10.0.

Then, 2.58 g of a sodium hypochlorite aqueous solution having an available chlorine concentration of 13.2% by mass was added thereto, and the resultant was stirred for 120 minutes using a stirrer while keeping the temperature at 25° C. in the same constant-temperature water bath and adding 0.1M sodium hydroxide to adjust the pH during the reaction at 10.0.

After completion of the reaction, the product was subjected to solid-liquid separation by suction filtration using a PTFE membrane filter having a mesh opening of 0.1 μm. The resulting filtered product was washed with pure water, and an amount of carboxyl groups was then measured. The amount of carboxyl groups was 1.50 mmol/g, and the amount of the filtered product was about 1.0 g.

(Measurement of $^{13}C$ Solid-State NMR of Oxidized Cellulose)

After the oxidized cellulose obtained in each of Example 2 and Comparative Example 8 was freeze-dried, the resultant was left at 23° C. and 50% RH for 24 hours or longer. Then, the measurement of $^{13}C$ solid-state NMR was carried out under the following conditions. The results are shown in FIG. 3 to FIG. 7.

Figure 4:
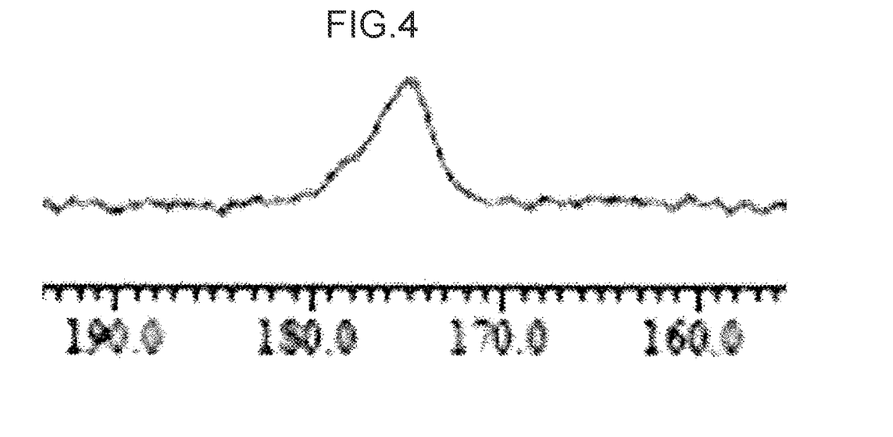
FIG. 4 is an enlarged view of a part of from 165 ppm to 185 ppm in FIG. 3.
Figure 5:
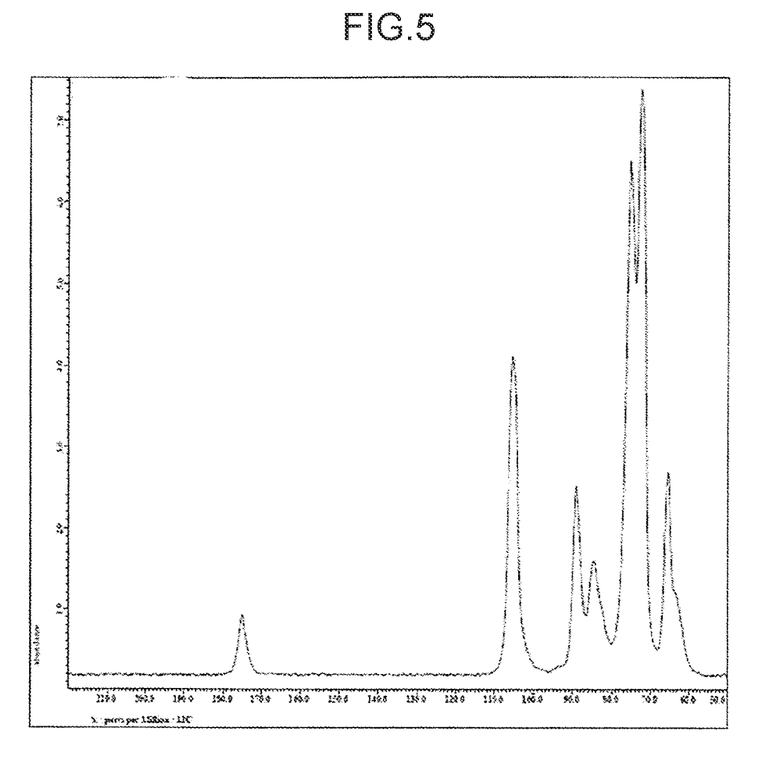
FIG. 5 is a $^{13}C$ solid-state NMR of the oxidized cellulose produced using a TEMPO catalyst in Comparative Example 8.
Figure 6:
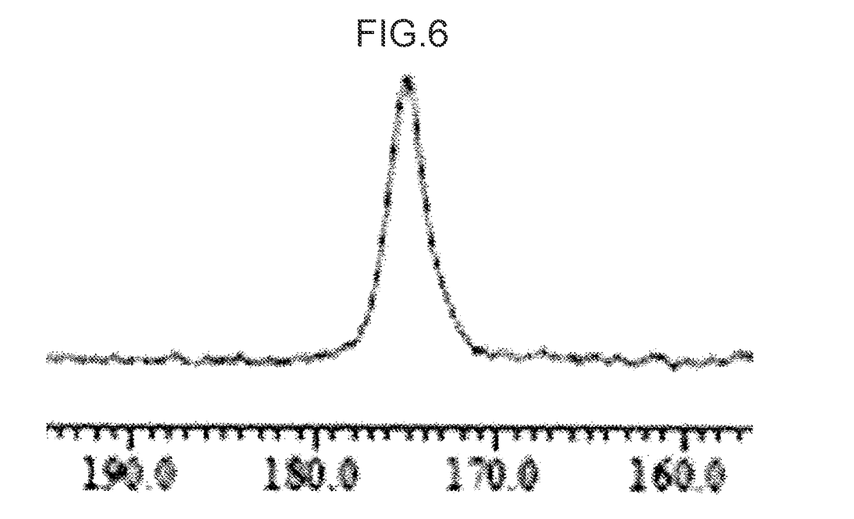
FIG. 6 is an enlarged view of a part of from 165 ppm to 185 ppm in FIG. 5.
Figure 7:
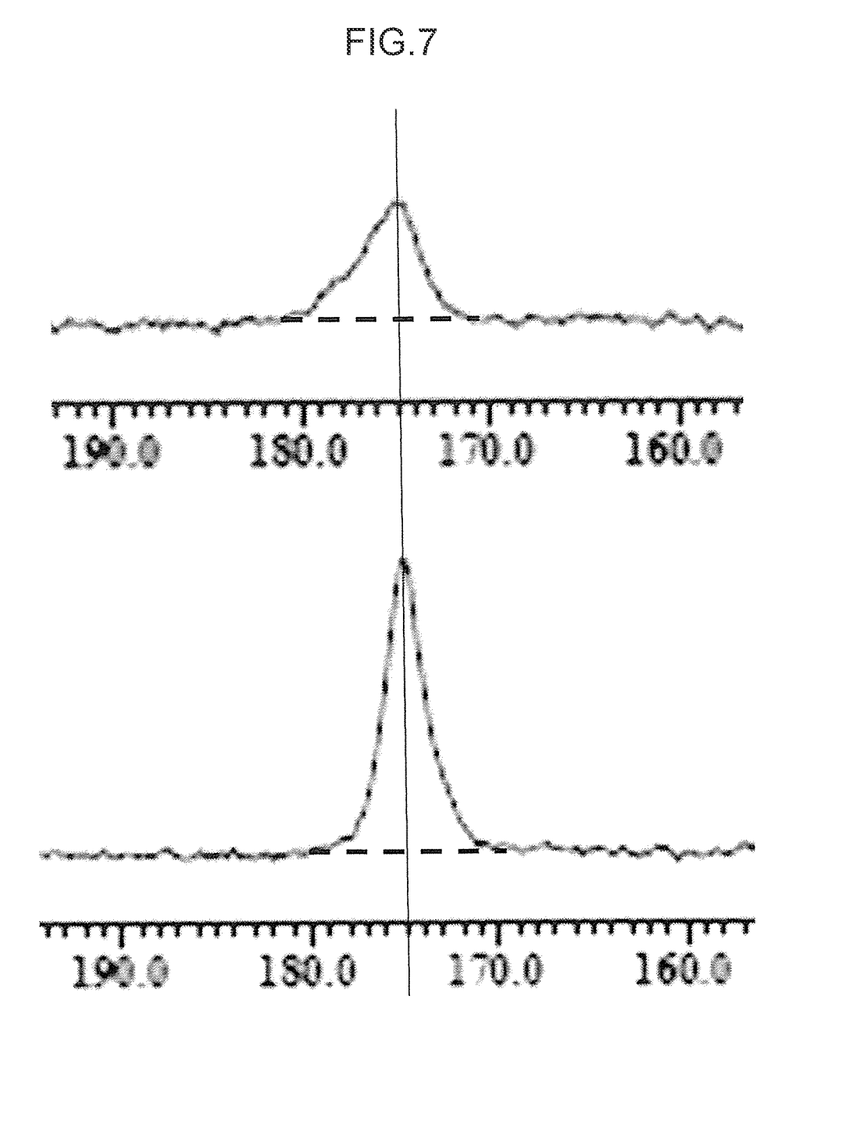
FIG. 7 is a diagram comparing a peak in the part of from 165 ppm to 185 ppm in FIG. 4 with that in FIG. 6.

Each of FIG. 4 and FIG. 6 is an enlarged view of a part of from 165 ppm to 185 ppm, and FIG. 7 is a diagram comparing the peak area ratio in FIG. 4 with that in FIG. 6.

In FIG. 7, the area value is subjected to vertical division at the peak top to obtain two peak area values, and a ratio (larger area value/smaller area value) of the two peak area values was 1.13 for Comparative Example 8 and 1.67 for Example 2.

Therefore, it is found that, while there is one peak for Comparative Example 8 (FIG. 6) that used a TEMPO catalyst, there is a number of peaks for Example 2 (FIG. 4) that did not use a TEMPO catalyst.

(Measurement Conditions of $^{13}C$ Solid-State NMR of Oxidized Cellulose)
  (1) Sample tube: 4 mm diameter made of zirconia
  (2) Magnetic field strength: 9.4 T (1H resonance frequency: 400 MHz)
  (3) MAS rotation speed: 15 kHz
  (4) Pulse sequence: CPMAS method
  (5) Contact time: 4 ms
  (6) Waiting time: 5 seconds
  (7) Accumulation time: 10,000 to 15,000 times
  (8) Measurement device: JNM ECA-400 (manufactured by JEOL Ltd.)

Reference Example 1: Fibrillation of Oxidized Cellulose (1)

20 g of 1% aqueous dispersion of the oxidized cellulose obtained in each of Examples 1 and 6, and Comparative Examples 2 and 5 was prepared, and subjected to fibrillation by an ultrasonic homogenizer "UP-400S" (manufactured by Hielscher Ultrasonics) under the conditions of CYCLE 0.5 and AMPLITUDE 50. The time until the liquid became almost transparent visually, accordingly, the time until fibrillation into nano level was achieved, was measured. In addition, the same liquid was stirred using a stirrer for 12 hours to confirm whether it became visually transparent.

When the amount of carboxyl groups was 0.55 mmol/g or more, the liquid became almost transparent within 10 minutes of ultrasonic homogenizer treatment and became almost transparent only by stirring for 12 hours. On the other hand, when the amount of carboxyl groups was 0.20 mmol/g or less, the liquid did not become transparent. Therefore, it can be said that an oxidized cellulose having an amount of carboxyl groups of 0.55 mmol/g or more is easily fibrillated.

| | Amount of Carboxyl Groups (mmol/g) | Transparency by Ultrasonic Homogenizer Treatment | Transparency by Stirring for 12 Hours |
|---|---|---|---|
| Example 1 | 0.62 | Within 10 min | Transparent |
| Example 6 | 0.96 | Within 10 min | Transparent |
| Comparative Example 2 | 0.15 | Not Transparent even after 30 min | Not Transparent |
| Comparative Example 5 | 0.09 | Not Transparent even after 30 min | Not Transparent |

Reference Example 2: Fibrillation of Oxidized Cellulose (2)

50 g of 0.1% aqueous dispersion of the oxidized cellulose obtained in each of Example 2 and Comparative Example 8 was prepared, subjected to fibrillation by an ultra-high speed homogenizer "Physcotron" (trade name, manufactured by Microtec Co., Ltd) at 7,500 rpm for 2 minutes, and then subjected to fibrillation by an ultrasonic homogenizer "US-300E" (trade name, manufactured by NIHONSEIKI KAISHA LTD.) in 4 minute intervals until it became transparent. Here, the standard of transparency was a transmittance at 660 nm of 90% or higher as subjected to UV-VIS measurement (cell length 10 mm).

It is found that, while the oxidized cellulose of Example 2 became transparent only by the ultra-high speed homogenizer, the oxidized cellulose of Comparative Example 8 required 8 minutes even by the ultrasonic homogenizer, which indicates that the fibrillation of Example 2 was more efficient.

What is claimed is:

1. An oxidized cellulose, a $^{13}C$ solid-state NMR spectrum of the oxidized cellulose comprising a plurality of peaks in a range of from 165 ppm to 185 ppm, wherein a content of carboxyl groups in the oxidized cellulose is from 0.55 mmol/g to 3.0 mmol/g with respect to a dry mass of the oxidized cellulose, wherein the oxidized cellulose is not an oxidized regenerated cellulose; and
wherein the oxidized cellulose is produced by a process comprising:
oxidizing a cellulose raw material with a solution prepared from a hypochlorous acid or salt thereof having an available chlorine concentration of from 7% by mass to 14% by mass, while adjusting the pH in a range of from 5.0 to 14.0, wherein the cellulose raw material is not a regenerated cellulose.

2. A method of producing a nanocellulose, the method comprising fibrillating and nanoizing the oxidized cellulose according to claim 1.

3. A nanocellulose dispersion, comprising the nanocellulose produced by the method according to claim 2 dispersed in at least one selected from the group consisting of water, acetonitrile, and a carbonate ester.

4. The oxidized cellulose according to claim 1, wherein the content of carboxyl groups in the oxidized cellulose is from 0.55 mmol/g to 0.96 mmol/g.

5. An oxidized cellulose, not containing an N-oxyl compound, a $^{13}C$ solid-state NMR spectrum of the oxidized cellulose comprising a plurality of peaks in a range of from 165 ppm to 185 ppm, wherein a content of carboxyl groups in the oxidized cellulose is from 0.55 mmol/g to 3.0 mmol/g with respect to a dry mass of the oxidized cellulose, wherein the oxidized cellulose is not an oxidized regenerated cellulose; and
wherein the oxidized cellulose is produced by a process comprising:
oxidizing a cellulose raw material with a solution prepared from a hypochlorous acid or salt thereof having an available chlorine concentration of from 7% by mass to 14% by mass, while adjusting the pH in a range of from 5.0 to 14.0, wherein the cellulose raw material is not a regenerated cellulose.

6. A method of producing an oxidized cellulose, the method comprising:
oxidizing a cellulose raw material with a solution prepared from a hypochlorous acid or salt thereof having an available chlorine concentration of from 7% by mass to 14% by mass, while adjusting the pH in a range of from 5.0 to 14.0, wherein the cellulose raw material is not a regenerated cellulose;
wherein the oxidized cellulose is not an oxidized regenerated cellulose.

7. The method of producing an oxidized cellulose according to claim 6, wherein the hypochlorous acid or salt thereof is sodium hypochlorite.

8. The method of producing an oxidized cellulose according to claim 6, wherein the cellulose raw material is oxidized while adjusting the pH in a range of from 7.0 to 14.0.

9. The method of producing an oxidized cellulose according to claim 6, wherein the hypochlorous acid or salt thereof has an available chlorine concentration of from 8% by mass to 14% by mass.

* * * * *